United States Patent [19]

Bocquet

[11] Patent Number: 4,852,022

[45] Date of Patent: Jul. 25, 1989

[54] INSTRUCTIONS SEQENCER FOR MICROPROCESSOR WITH MATRIX FOR DETERMINING THE INSTRUCTIONS CYCLE STEPS

[75] Inventor: Christian Bocquet, Aix en Provence, France

[73] Assignee: Thomson Semiconducteurs, Paris, France

[21] Appl. No.: 57,058

[22] PCT Filed: Sep. 10, 1986

[86] PCT No.: PCT/FR86/00303

§ 371 Date: Apr. 30, 1987

§ 102(e) Date: Apr. 30, 1987

[87] PCT Pub. No.: WO87/01839

PCT Pub. Date: Mar. 26, 1987

[30] Foreign Application Priority Data

Sep. 10, 1986 [FR] France ............... 85 13634

[51] Int. Cl.[4] .................. G06F 9/22
[52] U.S. Cl. .................. 364/200
[58] Field of Search ... 364/200 MS File, 900 MS File

[56] References Cited

U.S. PATENT DOCUMENTS

| | | | |
|---|---|---|---|
| 4,317,275 | 3/1982 | Dozier | 29/571 |
| 4,354,228 | 10/1982 | Moore et al. | 364/200 |
| 4,471,457 | 9/1984 | Videki | 364/900 |
| 4,519,033 | 5/1985 | Vaughn | 364/200 |
| 4,586,128 | 4/1986 | De Woskin et al. | 361/200 |
| 4,660,171 | 4/1987 | Moore et al. | 364/900 |

FOREIGN PATENT DOCUMENTS 0082328 6/1983 European Pat. Off.

Primary Examiner—David Y. Eng
Attorney, Agent, or Firm—Oblon, Spivak, McClelland, Maier & Neustadt

[57] ABSTRACT

The invention concerns an instructions sequencer for a microprocessor, the sequencer comprising an instructions decoding unit followed by a unit for determining the steps which defines the cycle instants at which must be activated the different function controls issuing from the sequencer, this step determination unit being produced in a particularly simple manner with a matrix of transistors in lines and columns, the transistors of one line being in series and the transistors of a column all being controlled by the same clock step, among the transistors, certain (T1) are depleted and are thus conductive whatever the clock step, while others are enriched and are only conductive during the step corresponding to their column.

2 Claims, 1 Drawing Sheet

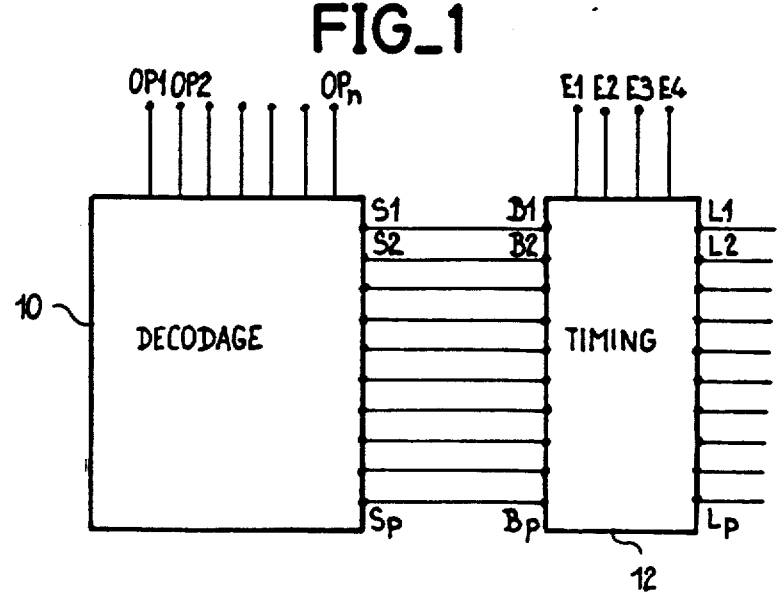
FIG_1
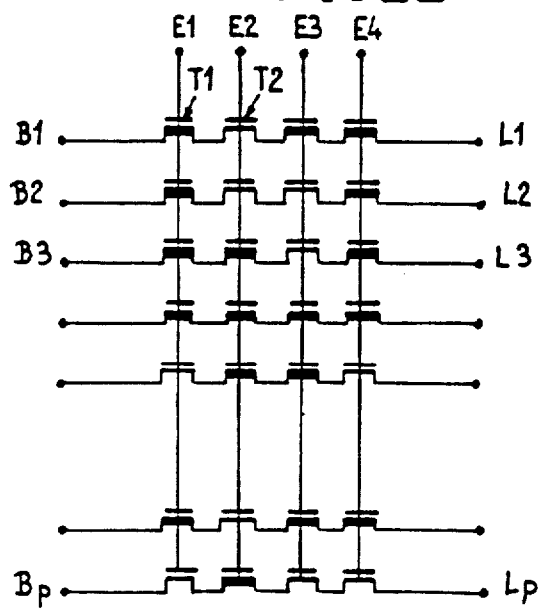
FIG_2

INSTRUCTIONS SEQENCER FOR MICROPROCESSOR WITH MATRIX FOR DETERMINING THE INSTRUCTIONS CYCLE STEPS

BACKGROUND OF THE INVENTION

1. Field of the invention

The present invention concerns complex integrated circuits, and more particularly microprocessors, that are circuits capable of carrying out not only a single well defined function but a whole variety of different functions. Instructions, in the form of coded signals received by the microprocessor, determine the functions to be carried out. The succession of the instructions received determines the sequence of a complex digital processing operation carried out by the microprocessor on date also received at its input.

Each instruction received is stored in an instruction register during the performance of the work corresponding to this instruction. An instructions sequencer causes to correspond to a determined instruction, i.e. to a group of well defined binary signals, a group of control signals appearing on the control lines at the output of the sequencer. These control lines are connected to logic gates, registers or other elements of the circuit. Each instruction thus acts in an unique manner upon a group of circuit elements of the microprocessor. The role of the sequencer is to transform the instructions into signals for controlling the different parts of the microprocessor.

The sequencer thus firstly has a decoding function : transformation of a group of binary signals (the instruction) into a group of control signals; each instruction generally activates several control lines and reciprocally a single control line can be activated by several different instructions.

But, furthermore, the sequencer must establish the performance step of the instruction; in fact, the carrying out of an instruction can lead for example to opening a logic gate then loading a register, etc... The control signals generated by the sequencer must thus appear according to a logic sequence in several steps or phases and not in a single step or phase.

This is the reason why an instructions sequencer generally comprises an instructions decoding circuit followed by a circuit for determining the activation steps of the signals issuing from the decoding circuit.

The present invention concerns more particularly the constitution of this circuit for determining the steps for activating the control lines of the microprocessor.

The usual solution for producing this circuit for determining the activation steps consists in placing at the output of the instructions decoding circuit AND and OR (or NAND or NOR if this appears more practical) gates receiving on the one hand the outputs of the decoding circuit and receiving on the other hand signals corresponding to the various steps of an instruction cycle. The outputs of these gates or groups of gates constitutes control lines activated at well defined steps.

In order to reduce the bulk of this circuit for step determination, and also to render its conception and its topology or lay-out easier between the outputs of the instructions decoding circuit and the outputs of the sequencer itself, without rendering manufacturing more difficult, the production of the circuit for step determination in a particularly simple matrix form is proposed herebelow.

According to the invention, the circuit for determining the steps is essentially constituted by a matrix of transistors arranged in lines and columns, transistors being present at all the lines and columns intersections, the transistors of a single line being placed in series between an output of the instructions decoding circuit corresponding to this line and an output of the circuit for step determination also corresponding to this line, the transistors of a single column all being controlled simultaneously by a signal corresponding to a respective step and the transistors of the other columns being controlled by signals corresponding to other steps, certain transistors being of the depleted type in order to be coductive whatever the control signal applied to the column of which they form part and certain transistors being of the enriched type in order to be conductive only during the step corresponding to the column of which they form part.

More generally, the invention concerns a matrix of logic gates (programmable by mask) that comprises transistors arranged in lines and columns, the transistors being present at all the lines and columns intersections, the transistors of a single line being placed in seriess between a matrix input corresponding to this line and a matrix output also corresponding to this line, the transistors of a single column all having their grids connected to a matrix input corresponding to this column and the transistors of the other columns having their grids connected to other matrix inputs corresponding to the other columns, certain transistors being of the depleted type in order to be conductive whatever the logic level applied to their grid and other transistors being of the non-depleted type in order to be conductive for a logic level applied to their grid and to be blocked for a complementary logic level applied to their grid.

BRIEF DESCRIPTION OF THE DRAWINGS

Other features, objects and advantages of the invention will become apparent from the following detailed description given by way of non-limitative illustration with reference to the appended drawings, in which:

FIG. 1 shows the very schematic overall structure of an instructions sequencer for microprocessor;

FIG. 2 shows the structure of the circuit for step determination according to the invention, to be used in the instructions sequencer.

The instructions sequences compriser very schematically two units that are respectively a decoding unit 10 and a step determination unit 12.

The decoding unit receives on its inputs OP1, OP2, ... OPn, binary signals representing the instructions to be carried out; these signals issue for example from an instructions register (not represented); the register contains a determined instruction that remains present troughout the entire operation cycle of the instruction.

The decoding unit 10 supplies on its outputs S1 to Sp other binary signals that will act to control the opening of the gates; the counter incrementation, the register displacement, etc...; a determined instruction allows the activation of several outputs and reciprocally a single output can be activated by several instructions. The decoding unit thus performs the decoding necessary for passing from binary signals representing the instruction to binary signals allowing to carry out the instruction.

The step determining unit 12 receives on the inputs B1 to Bp the different output signals of the decoding unit and reeives furthermore on the other inputs (in the present example four inputs E1 to E4) clock signals representing different steps of the cycles for carrying out the instructions. The outputs of this unit 12 are designated by the references L1 to Lp. The function of this unit is to authorize the passage of a determined output signal during one step or a combination of well-defined steps of the cycle.

The unit for determining the steps thus carries out a function of opening and closing the logic gates.

For example, the different steps of the cycle are represented by four clock signals P1 to P4 applied respectively to the inputs E1 to E4. If it is desired that the signal on the input B1 only appears at the output of the sequencer during the step P3 for example, and AND gate with two inputs is used, one input of which is connected to the input B1 and the other input of which is connected to the input E3. Furthermore, if it is desired that the signal on the input B2 only be activated during the steps P1 and P4, two AND gates with two inputs (B2 and E1, B2 and E4) will be used followed by an OR gate receiving the outputs of this AND gate. Another example is the following: if the signal on the input B3 must be transmitted throughout the whole cycle period, a logic gate will not be used but will be replaced by a direct connection between the input B3 and an output of the circuit for determining the steps.

The circuits of the prior art are constituted in this manner with gates having two or several inputs or direct connection if required. Each gate comprises strictly as many inputs as necessary for elaborating the desired AND and OR functions. Of course, as it is well know, the logic gates could also be NAND and NOR gates according to whether the logic levels of the steps or the inputs are active at the high level or the low level. For the NAND and OR gates it has been considered that the active levels on all the inputs were high levels.

With respect to this classical structure with at each line one or several logic gates having variable and limited input numbers or with at certain sites a simple inverter or a total absence of logic gate, the present invention proposes a structure in regular matrix for the unit 12 determining the steps.

This structure is visible in FIG. 2. It comprises transistors arranged in lines and columns. To each column corresponds a particular step and to each line corresponds a control signal for transmitting during a step or a combination of particular steps of the cycle.

A transistor is placed at each of the intersections of one line and one column.

All the lines thus comprise the same number of transistors. On FIG. 2 there are four columns thus four transistors per line. There are p lines.

The transistors of a single column all have their grid connected to a single conductor (CC1 to CC4 for the columns 1 to 4) that is itself connected to a respective input (E1 to E4). Each of the inputs E1 to E4 receives a respective clock signal representing a particular clock signal that will be referred to as cycle step.

The transistors of a single line are all in series, i.e. the drain of any one of them is connected to the source of the following one. This assembly in series of transistors of a single line is connected between a respective input (Bl to Bp) of the unit, and a respective output (L1 to Lp) corresponding to the same line.

Among all these transistors certain of them are of the depleted type, such as T1, and are represented with a heavy line between the source and the drain, and others are of the normally enriched type, such as T2, and are represented with a thin line between the source and the drain. The depleted transistors have a channel doping so that they are conductive whatever the logic level applied to their grid; for example, while admitting that the low logic level is at zero volt and the high logic level is at 5 volts, for a transistor with a normal N channel (non depleted), the transistor is conductive if the grid-source difference of potential is 5 volts and it is blocked if it is of zero volt. For a transistor with N depleted channel, it is conductive in both cases; it would only be blocked for example by a voltage of $-5$ volts but the circuit is conceived so that the difference of potential of the grid with respect to the source only varies from 0 to $+5$ volts.

In particular, the different steps are defined by logic clock signals applied to the column conductors, and these signals have levels (for example, from 0 to 5 volts) so that the non depleted transistors are blocked or conductive according to the level of the clock signal whereas the depleted transistors are always conductive.

On FIG. 2, it will be seen that certain input signals of the unit for determining the steps are applied to an assembly of transistors which are all depleted except for one which is controlled by a clock signal corresponding to one step; the input signal will only be transmitted to the output during this step.

Other input signals are applied to an assembly of transistors several of which are not depleted transistors and are controlled by distinct steps; the input signal on the corresponding line will only be transmitted at the outut during the mutual overlapping period of the two steps.

If a line comprises four depleted transistors, the output signal will be transmitted during the whole of the cycle. In all these cases, the structure according to the invention is such that each line constitutes a controlled gate but all the gates comprise the same inputs which are column conductors corresponding to the different clock signals.

In certain cases, it is possible to provide connecting together two or several outputs, thereby establishing an OR function; for example, if the outputs L1 and L3 are connected and form a single output, this output will transmit the input signal B1 during the step E2 or the input signal B3 during the step E3.

The structure of this unit is very compact and very simple in conception. Only the type of transistor for each line and column intersection must be specified in order to defined the synchronization of the output signals of the sequencer. Furthermore, manufacturing is very simple since the definition of the type of transistor is made by a mask which globally protects all the zones corresponding to depleted transistors against the implantation of enrichment impurities; a complementary mask can also protect all the zones corresponding to enriched transistors against the implantation of depletion impurities the whole of the zones corresponding to the enriched transistors.

The unit fo determining the steps in the matrix is easily used for other applications since in fact it constitutes a matrix of gates each having n inputs common to the other gates and an individual input different to that of the other gates. Among the n common inputs only those that correspond to a non depleted transistor act effectively as AND input gates, the others being neutralized.

What is claimed is:

1. An instruction sequencer for microprocessors, having inputs for receipt of binary signals representing the instructions and having outputs for signals for controlling the functions of the microprocessor, comprising:

circuit means for generating these control signals which generates step signals only during predetermined steps of the instruction cycles, said sequencer further comprising an instructions decoding circuit and a circuit for determining the activation steps of the control signals, wherein the circuit for determining the activation steps is comprised of:

a matrix of transistors arranged in rows and columns, one transistor being present at each of said row and column intersections of said matrix, with the transistors of a single row being connected in series, the drain of each transistor of said row being connected to the source of the transistor following this transistor on said given row and between an output of the instructions decoding circuit corresponding to said given row and an output of said matrix, with said output, corresponding to said given row being one of said instructions sequencer outputs;

means for the transistors, of a single column to be controlled simultaneously by a signal provided by said circuit for generating a signal corresponding to a respective step and the transistors of the other columns being controlled by other step signals provided by said circuits for generating signals corresponding to other steps, said circuit for generating signals corresponding to steps providing signals when said instructions are to be sent to said microprocessor, transistors of said matrix being of the depleted type wherein said transistors are conductive irrespective of any control signal being applied to said transistors associated column and transistors of said matrix being of the enriched type in order to be conductive only during the step corresponding to the column of which they form part of.

2. A matrix of logic gates comprising: transistors arranged in rows and columns, with a transistor being present at each of the row and column intersections of said matrix, with the transistors of a single row being placed in series, the drains of such transistor of said row being connected to the source of another transistor following this transistor in said row, between a matrix input corresponding to this row and a matrix output also corresponding to this row;

the transistors of a single column having their grids connected to a same matrix input corresponding to this column and the transistors of the other columns having their grids connected to other matrix inputs corresponding to the other columns, certain transistors being of the depleted type in order to be conductive irrespective the logic level applied to their grid and other transistors being of the non-depleted type, in order to be rendered conductive in response to a given logic level being applied to their grid and to be blocked for a complementary logic level applied to their grid.

* * * * *

UNITED STATES PATENT AND TRADEMARK OFFICE
CERTIFICATE OF CORRECTION

PATENT NO. : 4,852,022
DATED : July 25, 1989
INVENTOR(S) : Christian BOCQUET

It is certified that error appears in the above-identified patent and that said Letters Patent is hereby corrected as shown below:

On the Title Page, Item [30], the priority information is incorrect. It should read as follows:

--Sep. 13, 1985 [FR] France............85 13635--

Signed and Sealed this

Fifth Day of June, 1990

Attest:

HARRY F. MANBECK, JR.

Attesting Officer   Commissioner of Patents and Trademarks